Patented Dec. 25, 1951

2,580,351

UNITED STATES PATENT OFFICE 2,580,351

CELLULOSE SULFAMYLETHYL ETHER

Vernon R. Grassie, Wilmington, Del., assignor to Hercules Powder Company, Wilmington, Del., a corporation of Delaware No Drawing. Application December 22, 1948, Serial No. 66,836

4 Claims. (Cl. 260—231)

This invention relates to new hydrophilic cellulose derivatives and more particularly to sulfamylethyl celluloses.

Many attempts have been made to introduce groups into cellulose whereby an alkali-soluble derivative may be obtained. It is well known that the introduction of the carboxymethyl or carboxyethyl groups into cellulose results in the production of water- and alkali-soluble derivatives of cellulose. However, these products suffer from the disadvantage that they precipitate in hard water due to the insolubility of the calcium and magnesium salts of these carboxyalkyl celluloses.

Now in accordance with this invention it has been found that new hydrophilic polysaccharides may be prepared. These new hydrophilic products are sulfamylethyl polysaccharides as, for example, sulfamylethyl celluloses. They are aqueous alkali-soluble and do not form insoluble salts when used in hard water.

The following examples illustrate the preparation of the new sulfamylethyl polysaccharides in accordance with this invention. All parts and percentages are by weight unless otherwise indicated.

Example 1

Three parts of cotton linters (20 mesh) were suspended in 100 parts of dioxane and 9 parts of a 40% aqueous sodium hydroxide (5 moles per anhydroglucose unit) were added. The slurry was agitated and heated at 70° C. for 1 hour after which 3.4 parts (1.72 moles per anhydroglucose unit) of vinyl sulfonamide were added. The etherification reaction was allowed to proceed for 4 hours at 70° C. The organic solvent was decanted and the fibrous product was washed 3 times with 80% methanol, then with anhydrous methanol and finally was dried at 60° C. in vacuo. The white fibers of sulfamylethyl cellulose amounted to 3.5 parts and contained 6.9% sulfur and 2.99% nitrogen, indicating a substitution of 0.45 sulfamylethyl group per anhydroglucose unit. The product swelled in water, but was highly soluble in dilute aqueous alkali, giving clear viscous solutions.

Example 2

One part of cotton linters (20 mesh) was macerated with 5 parts of an aqueous 40% sodium hydroxide solution (8 moles per anhydroglucose unit). The alkali-cellulose crumbs were then thoroughly kneaded with 1.2 parts of vinyl sulfonamide (1.76 moles per anhydroglucose unit) and the mass was maintained at 65° C. for 6 hours. The resultant dough was dispersed by addition of 80% methanol and the fibrous product separated. The product was washed 3 times with 80% methanol, then with anhydrous methanol and finally dried at 60° C. in vacuo. The sulfamylethyl cellulose so obtained amounted to 1.35 parts and contained 7.1% sulfur and 3.20% nitrogen indicating a degree of substitution of 0.48 sulfamylethyl group per anhydroglucose unit. It had the same solubility characteristics as described in Example 1.

Example 3

Two parts of cotton linters (20 mesh) were suspended in 75 parts of tertiary butanol and treated with 6 parts of an aqueous 40% sodium hydroxide solution (5 moles per anhydroglucose unit) and the mixture was heated for 1 hour at 70° C. Vinyl sulfonamide, 0.86 part, (0.65 mole per anhydroglucose unit) was added and the reaction mixture was heated at 70° C. for 4 hours. The product was isolated, purified and dried in the manner described in Example 1. The sulfamylethyl cellulose so obtained amounted to 2.6 parts and contained 6.2% sulfur and 2.72% nitrogen (indicating a degree of substitution of 0.40 sulfamylethyl group per anhydroglucose unit). This product was insoluble in water but entirely soluble in dilute aqueous alkali.

Example 4

One part of purified wood pulp (20 mesh) was suspended in 50 parts of isopropanol and treated with 3 parts of an aqueous 40% sodium hydroxide solution (5 moles per anhydroglucose unit). After heating for 1 hour at 80° C., 1.94 parts of vinyl sulfonamide (2.94 moles per anhydroglucose unit) was added to the alkali-cellulose slurry. The reaction mixture was then heated at 80° C. for 3½ hours. The product was isolated, purified and dried as described in Example 1. The sulfamylethyl cellulose was obtained as white fibers and amounted to 1.62 parts. It contained 10.7% sulfur and 4.70% nitrogen, indicating a degree of substitution of 0.85 sulfamylethyl group per anhydroglucose unit. This product was slightly soluble in water and entirely soluble in dilute aqueous alkali.

In accordance with this invention sulfamylethyl ethers of polysaccharides may be prepared, the introduction of the sulfamylethyl group imparting aqueous alkali-solubility to polysaccharides which, prior to the introduction of these groups, did not possess such solubility characteristics. Polysaccharides which may be etherified to produce the new sulfamylethyl ethers include such polysaccharides as cellulose, or partially substituted celluloses, starch, cellodextrins, pectic substances, etc.

The new sulfamylethyl ethers of polysaccharides are readily prepared by the addition of a vinyl sulfonamide to the polysaccharide in the presence of an alkaline reagent. The reaction, using cellulose as a typical polysaccharide, may be represented as follows:

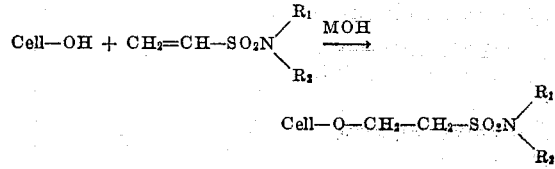

where Cell—OH represents an etherifiable hydroxyl group of cellulose, $R_1$ and $R_2$ may each be hydrogen, alkyl, aryl, aralkyl, or cycloalkyl, and MOH is a strongly alkaline hydroxide.

These new sulfamylethyl ethers of polysaccharides may also be prepared by the reaction of a 2-haloethane sulfonamide with the polysaccharide in the presence of an alkaline reagent. This reaction, again using cellulose as typical, may be represented as follows:

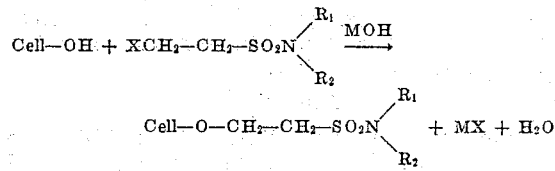

where X is halogen and the other symbols have the same significance as in the above equation. This latter method of preparation is less desirable from a commercial standpoint in view of the by-product separation required and the weight loss involved in the production of such a by-product.

The vinyl sulfonamide, or haloethane sulfonamide, which is reacted with the polysaccharide such as cellulose may be the sulfonamide itself or a substituted sulfonamide. For example, the amido hydrogens may be substituted by alkyl, aryl, aralkyl, or cycloalkyl radicals. Typical of such substituted sulfonamides which may be used are N-methyl vinyl sulfonamide, vinyl sulfonanilide, N-benzyl vinyl sulfonamide, N-cyclohexyl vinyl sulfonamide, etc.

The reaction between the polysaccharide and the vinyl sulfonamide or haloethane sulfonamide takes place in the presence of an alkaline reagent. Any strongly alkaline hydroxide as, for example, the alkali metal hydroxides such as sodium hydroxide, potassium hydroxide, etc., or the quaternary ammonium hydroxides such as trimethyl benzyl ammonium hydroxide, etc., may be used. The alkaline reagents are believed to function in two ways in the etherification reaction; they swell and disperse the cellulose or other polysaccharide, thus activating it, and they catalyze the vinyl sulfonamide addition and in the case of the haloethane sulfonamides, neutralize the hydrogen halide by-product.

The reaction between the polysaccharide as, for example, cellulose and the sulfonamide compound may be carried out by the slurry or fibrous process or by the usual aqueous or dough process. The mode of introducing the alkaline reagent into the reaction mixture will depend upon the type of process to be used.

When the reaction is carried out by the slurry or fibrous process, the cellulose or polysaccharide may be converted to an alkali cellulose or polysaccharide by suspending the cellulose in an organic solvent and then treating it with an aqueous solution of from 20 to 80% concentration of the alkaline reagent. In this alkali cellulose preparation, the amount of alkaline reagent added may vary from about 3 to 8 moles per anhydroglucose unit. The reaction proceeds favorably with higher proportions of alkali, but no advantage is to be realized by this modification. The mixture of cellulose, or cellulose derivative, or other polysaccharide, organic solvent and alkaline reagent may then be agitated and heated for 1 hour at 50° C. or above, or it may be simply agitated at room temperature. An alternative method of alkali-polysaccharide formation consists of pretreating the carbohydrate material with an aqueous alkaline reagent and then suspending the crumbs so formed in an organic solvent before the etherification reaction. Substantially the same results are obtained by this procedure.

Any organic solvent which is inert under the reaction conditions may be used for carrying out the reaction by the slurry process. The main purpose of the solvent is to serve as a heat transfer medium and also to serve as a dispersing and insolubilizing agent so that the hydrophilic derivative will remain in a finely fibrous condition. Among the solvents which may be used are dioxane, isopropanol, tert-butanol, tetrahydrofuran, ethylene glycol diethyl ether, etc. The amount of solvent used is determined by the type of agitation available for the heterogeneous reaction and also by the form of the cellulose or cellulose derivative used; i. e., the state of subdivision. In general, with ground cotton linters a cellulose to solvent ratio of about 1:9 to about 1:25 is used and with ordinary shredded linters a ratio of about 1:25 to about 1:50 is used.

Prior to the vinyl sulfonamide addition, the suspension of alkali-cellulose in the organic solvent is adjusted to the temperature desired for the reaction. This temperature, in general, may vary from about 50° C. to about 130° C. and preferably is from about 70° C. to about 90° C. If the particular solvent being used has a boiling point below this range of temperature, the reaction can be carried out under pressure. The vinyl sulfonamide is added to the alkali-cellulose suspension in proportions which depend on the degree of substitution desired in the product, but in general about 0.5 to about 2.0 equivalents per anhydroglucose unit are added. The vinyl sulfonamides may be added as such, or as a solution in water or some suitable organic solvent. After the addition of the sulfonamide, the reaction is allowed to proceed in the preferred temperature range with constant agitation for from about 1 to about 8 hours. Longer reaction times may be used but are apparently not required.

When the reaction is carried out by the aqueous or dough process, the cellulose or polysaccharide may be converted to an alkali cellulose or polysaccharide by kneading with aqueous alkali or other alkaline reagent. The amount of alkali used is equal to or greater than that used in the slurry process. If desired, a large excess of the aqueous alkaline reagent may be used to facilitate the kneading operation. In this case the excess is pressed from the cellulose prior to etherification. The alkali cellulose prepared in this manner is then macerated thoroughly at room temperature with the vinyl sulfonamide. As before, the proportion of vinyl sulfonamide used will depend upon the degree of substitution desired in the product. The mixture is then heated, preferably to a temperature of about 60° C. to about 90° C. for from 1 to 8 hours with or without intermittent kneading. The resultant semiplastic mass may then be treated by adding a diluent such as a 70 to 80% methanol-water solvent, the diluent serving to disperse the product in a fibrous condition and to dissolve the alkali and excess vinyl sulfonamide.

The new sulfamylethyl celluloses of this invention have many outstanding properties. They are soluble in dilute aqueous alkali, even down to a degree of substitution of about 0.20 sulfamylethyl groups per anhydroglucose unit, but are not appreciably soluble in water. However, the degree of solubility in water increases slightly with increasing substitution. For example, those containing less than 0.4 group per glucose unit are completely insoluble, and in fact those containing up to 0.65 group per glucose unit may be considered as insoluble in water, but more highly substituted derivatives may be swollen by water or may even be slightly soluble in water. These new products are insoluble in aqueous acid regardless of the degree of substitution and are unlike other water- or alkali-soluble derivatives of cellulose in that they are instantaneously precipitated in fibrous condition from their aqueous alkali solutions upon acidification with either mineral or organic acids.

The sulfamylethyl celluloses are valuable hydrophilic colloids which possess suspending, thickening, stabilizing, and film-forming properties. Thus, they may be used as greaseproof film coatings for paperboard, etc., as detergents or detergent additives, as thickening agents in textile printing pastes, latex dispersions, etc. Due to their property of being precipitated in fibrous form from alkaline solutions on acidification, they are valuable beater additives for increasing the mechanical strength of paper.

What I claim and desire to protect by Letters Patent is:

1. The process of preparing a sulfamylethyl ether of cellulose which comprises reacting cellulose with a vinyl sulfonamide in the presence of an alkaline reagent.

2. The process of preparing a sulfamylethyl ether of cellulose which comprises reacting a suspension of the cellulose in an inert organic solvent with a vinyl sulfonamide in the presence of an alkaline reagent.

3. The process of preparing a sulfamylethyl ether of cellulose which comprises reacting a suspension of an alkali cellulose in an inert organic solvent with a vinyl sulfonamide.

4. A water-insoluble sulfamylethyl ether of cellulose containing from about 0.2 to about 0.65 sulfamylethyl group per glucose unit.

VERNON R. GRASSIE.

REFERENCES CITED

The following references are of record in the file of this patent:

UNITED STATES PATENTS

| Number | Name | Date |
| --- | --- | --- |
| 2,132,181 | Neugebauer et al. | Oct. 4, 1938 |
| 2,148,554 | Hentrich | Feb. 28, 1939 |
| 2,422,000 | Dickey | June 10, 1947 |

OTHER REFERENCES

McIlroy: "The Polysaccharides," 1948, page 39.